Figure 1:
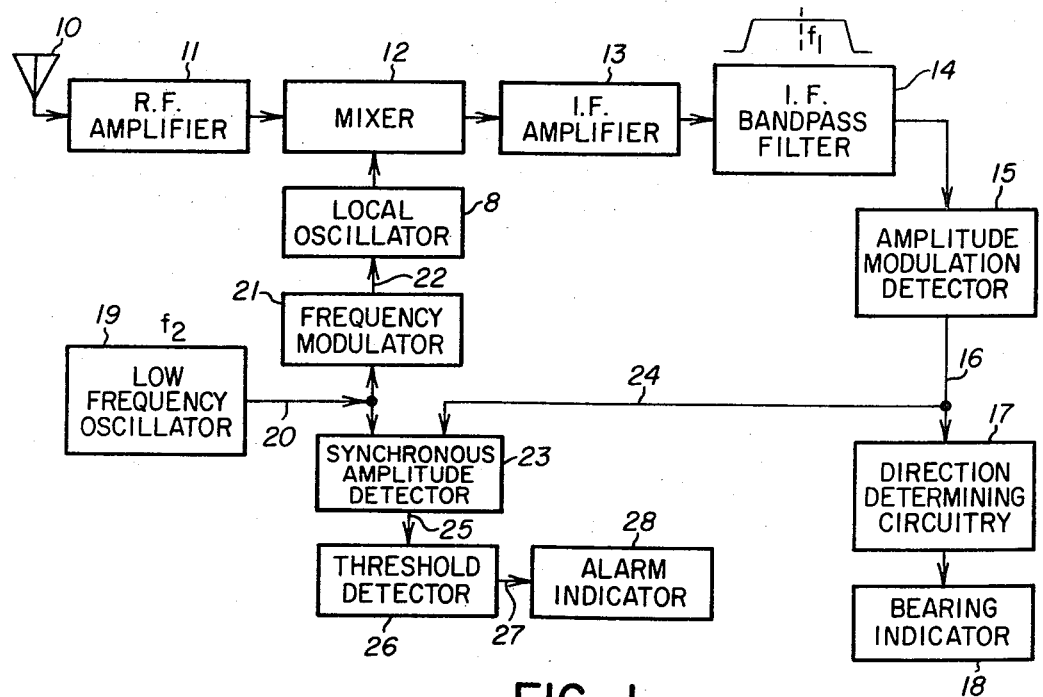

United States Patent
Stover et al.

[11] 3,718,928
[45] Feb. 27, 1973

[54] FALSE VOR BEARING INDICATION MONITOR

[75] Inventor: Harris A. Stover, Cedar Rapids, Iowa

[73] Assignee: Collins Radio Company, Cedar Rapids, Iowa

[22] Filed: Aug. 26, 1971

[21] Appl. No.: 175,262

[52] U.S. Cl. .................................. 343/106 R, 343/102; 325/364
[51] Int. Cl. .............................. G01s 1/44
[58] Field of Search .................... 343/106 R, 343/102; 325/364

[56] References Cited

UNITED STATES PATENTS 3,369,238 2/1968 R. L. Stauffer et al. ........ 343/106 R
3,527,295 8/1970 E. S. Perkins ................ 343/106 R
3,665,470 5/1972 W. R. Hemme ............... 343/106 R Primary Examiner—Benjamin A. Borchelt
Assistant Examiner—R. Kinberg
Attorney—Richard W. Anderson et al.

[57] ABSTRACT

A monitoring means for detecting mistuning of a VOR receiver which, due to FM to AM conversion in the receiver IF bandpass filter, causes false bearing determination. Locally induced frequency modulation of the receiver intermediate frequency produces locally induced amplitude modulation which does not appear on the output of the receiver AM detector if the received signal is within the useful portion of the IF filter passband. Any such locally induced amplitude modulation at the AM detector output is indicative of receiver mistuning and detection of same may operate threshold sensitive alarm means.

7 Claims, 2 Drawing Figures

FALSE VOR BEARING INDICATION MONITOR

BACKGROUND OF THE INVENTION

This invention relates generally to improvement in variable omnirange (VOR) receivers and more particularly to a monitoring means for annunciating false VOR bearing indications which may stem from a receiver erroneously tuned to an empty channel adjacent to a relatively strong channel.

The VOR system presently in use employs a cardioid antenna pattern that rotates 30 times per second producing a 30 Hz AM signal in the aircraft receiver. A 30 Hz reference signal is also transmitted as a 30 Hz frequency modulation of a 9960 Hz AM subcarrier with a deviation of ±480 Hz. The airborne receiver develops an output indication of bearing to the ground station by comparing the phase between these two 30 Hz modulations. In another compatible system known as Doppler VOR, the 30 Hz AM modulation does not vary with direction but the phase of the 30 Hz FM modulation of the 9960 Hz subcarrier becomes a function of the direction from the VOR station. These two systems are considered compatible because the same receiver may be employed with both systems.

At the present time, VOR stations are spaced 100 kHz apart in frequency. Future planning, however, calls for reduced spacing between adjacent channels of only 50 kHz so as to double the number of possible ground stations. Reduction of the channel spacing from 100 kHz to 50 kHz, however, can give rise to a potential problem. To illustrate this potential problem, let it be considered that approximately 10.5 kHz is required on either side of the carrier frequency for a particular channel to accommodate the 9960 Hz subcarrier and its modulation sidebands. Further, it may be assumed that the ground station may have a frequency tolerance of ± approximately 5.6 kHz. Further, the assumption of a similar frequency tolerance for the receiver establishes a total bandwidth requirement of ± nearly 22 kHz. In order not to have the modulation sidebands fall near the corner frequencies of the bandpass filter employed for selectivity in the VOR receiver, the total bandpass filter bandwidth required requirement begins to approach 50 kHz. Thus, with the advent of 50 kHz channel spacing, the sidebands of an adjacent channel may well extend on to the skirts of the selectively defining filter of a particular receiver. Normally, the situation would cause no problem, since if there were any significant signal within the desired channel, it would be sufficiently stronger than the adjacent channel signal on the skirts of the receiver filter selectivity curve that the interference from the adjacent channel would have no effect. However, under the particular circumstance where there is no signal at all on the tuned channel and a relatively strong signal in the adjacent channel, the VOR receiver may give an erroneous direction signal. This situation may unfortunately occur should the receiver be erroneously tuned 50 kHz from a desired channel. Co-pending application Ser. No. 61,954 entitled "VOR Adjacent Channel Sensor" by William R. Hemme, filed Aug. 7, 1970 now U.S. Pat. No. 3,665,470, dated May 23, 1972, and assigned to the assignee of the present invention, outlines this similar problem and sets forth a particular solution to the problem.

It is entirely possible that a pilot may through pilot error, in selecting a given frequency for a particular VOR ground station, tune the indicator 50 kHz from the desired frequency and give rise to the particular problem under discussion here. As pointed out in U.S. Pat. No. 3,665,470, dated May 23, 1972, it is entirely possible for the code identification audio signal to be received with this mistuning situation such that the pilot may be misled into believing he is properly tuned to the desired station. Further, as will be discussed, and as is outlined in U.S. Pat. No. 3,665,470, tuning to a channel adjacent to a desired operating channel gives rise to a situation where the receiver, due to the particular selectivity curve of the bandpass filter therein, presents a false VOR indication and develops indicating signals of sufficient strength that the flag warning channel of the receiver does not respond. A completely false VOR direction indication without benefit of flag warning is presented to the pilot with obvious catastrophic results.

In accordance with the present invention, it has been found that the erroneous bearing indication under the above outlined conditions may arise as a result of FM to AM conversion of one of the modulation sidebands resulting from the 9960 Hz subcarrier modulation. This FM to AM conversion would result from slope detection on the skirt of the bandpass filter which provides the receiver selectivity. Thus, the resulting signal which passes through the filter will have AM components derived from the FM modulation of the subcarrier. The output of the receiver AM detector will contain both the 9960 Hz subcarrier and a 30 Hz signal derived from the 30 Hz modulation of the subcarrier. The two 30 Hz modulations can be compared in phase within the receiver to give the erroneous bearing indication. It is extremely important that, under such circumstances, there should be an indication that the bearing information is in fact erroneous.

Accordingly, the object of the present invention is the provision for supplementing a standard VOR receiver circuitry with monitoring circuitry to provide an alarm indication or other annunciation when a false VOR bearing due to adjacent channel mistuning is occurring within the receiver.

The present invention is featured in the provision of monitoring means responsive to the output of the AM detector of a VOR receiver when a locally produced frequency modulating signal is utilized in the receiver. A phase detector compares the outputs from the locally produced modulating source oscillator and the receiver AM detector to determine whether a resulting frequency modulation of the received signal as it appears at the bandpass filter in the VOR receiver is converted to amplitude modulation. Amplitude modulation at the locally introduced modulating frequency does not appear on the output of the AM detector if the received signal is within the useful portion of the IF filter passband. Should the receiver be tuned to an inactive channel adjacent an active channel, the locally introduced AM modulation does appear and the phase detector provides a means for developing an output signal for threshold alarm indication.

Figure 2:
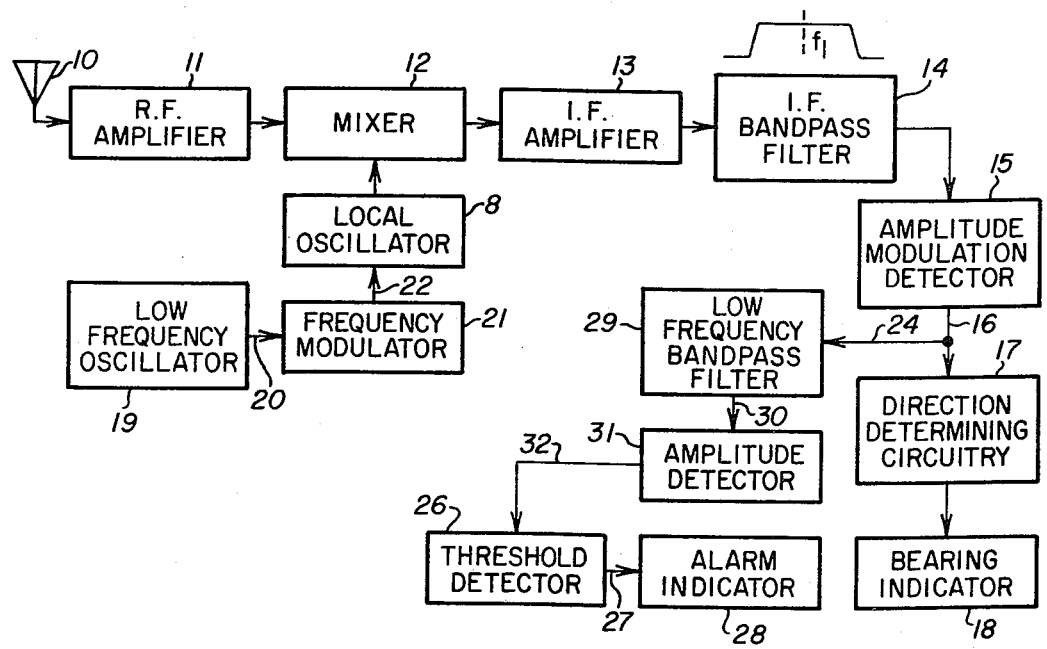

These and other features and objects of the present invention will become apparent upon reading the following description with reference to the accompanying drawing in which;

FIG. 1 is a functional block diagram of a first monitoring embodiment in accordance with the present invention to determine the development of false VOR bearing indications; and FIG. 2 is a functional block diagram of a further monitoring embodiment in accordance with the present invention to detect the generation of false VOR bearing indications.

Functional blocks 8-18 of FIG. 1 represent a standard VOR receiver wherein a transmitted signal is picked up on antenna 10 and applied to RF amplifier 11. The output from RF amplifier 11 is applied to a mixer 12 to which an injection frequency from local oscillator 8 is applied. The output from mixer 12 constitutes the IF frequency of the system and is applied to IF amplifier 13. The output from IF amplifier 13 is applied to the receiver bandpass IF filter 14 the output of which is applied to the receiver AM detector 15. The output 16 from AM detector 15 is applied to standard VOR direction determining circuitry 17 the output of which is applied to bearing indicator 18 to present the VOR bearing of the receiver from the ground station to which the receiver is tuned.

As previously discussed, should the receiver be tuned to an inactive channel adjacent an active channel, the output from the receiver IF bandpass filter 14 may include both AM and FM modulation components due to the effect of certain sidebands of signals from the active adjacent channel appearing on the skirt of the passband characteristic of the bandpass filter 14. As previously discussed, this situation gives rise to the receiver developing erroneous bearing indications on the indicator 18.

In accordance with the embodiment of FIG. 1, the local oscillator 8 of the receiver is frequency modulated by a locally produced signal 20 at frequency $f_2$ generated by a low frequency oscillator 19. With reference to FIG. 1, the output 20 from low low frequency oscillator 19 is applied to a frequency modulator 21 the output 22 of which is applied to the local oscillator 8 to frequency modulate the local oscillator in accordance with the low frequency oscillator operating frequency $f_2$. The IF output from mixer 12 of the receiver is then frequency modulated by the modulating frequency $f_2$. The output of the AM detector 15 of the VOR receiver is utilized to provide a first input 24 to a synchronous amplitude detector 23 to which the low frequency oscillator signal 20 is applied as reference input. The output 25 from synchronous amplitude detector 23 is applied to a threshold detector 26 the output 27 of which activates alarm indicator 28.

In operation, the frequency of local oscillator 8 is modulated by frequency modulator 21 by the locally produced modulating signal $f_2$ generated by oscillator 19. Thus, the intermediate signal as it arrives at IF amplifier 13 has been frequency modulated by the low frequency signal $f_2$ in addition to the normal amplitude modulation provided at the transmitter. The signal applied to IF amplifier 13 is amplified and subsequently filtered in IF filter 14. The output from the filter is conventionally AM detected in AM detector 15.

If the received signal is within the useful portion of the IF filter passband, the frequency modulation of the signal which was locally supplied by low frequency oscillator 19 and frequency modulator 21 will have no effect on the output of the AM detector 15. However, if the received signal is from an adjacent channel, the IF signal applied to the bandpass filter 14 lies on the skirts of the filter selectivity curve [the situation to be avoided] and there will be FM to AM conversion in the bandpass filter 14 such that the AM detector 15 generates an output at the frequency $f_2$ of the low frequency oscillator 19. The output 16 from the AM detector 15 in addition to being conventionally applied to the VOR direction determining circuitry 17, is applied on line 24 as input to the monitoring synchronous amplitude detector 23. (The synchronous amplitude detector may have the configuration of a conventional phase detector.) Synchronous amplitude detector 23, utilizing the low frequency oscillator 19 modulating frequency $f_2$ as a reference, serves as a synchronous detector and produces an output 25 with the presence of modulating frequency $f_2$ on the output of AM detector 15. A threshold detector 26 may respond to output 25 from phase detector 26 to produce an output 27 corresponding to a selected amplitude of the frequency component $f_2$ appearing at the output 16 of AM detector 15 to activate the alarm indicator 28.

A further monitoring embodiment in accordance with the present invention is illustrated functionally in FIG. 2 wherein the VOR receiver blocks 8-18 again represent conventional VOR receiver circuitry. In the embodiment of FIG. 2 the phase detector 23 of FIG. 1 has been replaced by a low frequency bandpass filter 29. The passband of low frequency bandpass filter 29 is centered at the $f_2$ frequency generated by low frequency oscillator 19. Low frequency bandpass filter 29 provides an output 30 to an amplitude detector 31 with the amplitude detector 31 being utilized to determine the magnitude of the output from the filter 29. The output 32 from envelope detector 31 is applied to threshold detector 26. The output 27 from threshold detector 26 activates alarm indicator 28 in response to a particular magnitude of the low frequency oscillator signal $f_2$ appearing at the output of the receiver AM detector 15.

The present invention is thus seen to provide a monitoring means responsive to locally produced frequency modulation of the local oscillator of a VOR receiver whereby the detection of a predetermined magnitude of the locally produced frequency modulating signal at the output of the AM detector of the receiver indicates that the receiver is mistuned from the received signal to such an extent that the direction determining circuitry may generate a false VOR bearing indication. This will include the situation where the received signal actually comes from an active adjacent channel with particular frequency components lying on the skirts of the receiver bandpass filter characteristic. Should the received signal be adequately centered within the passband of the receiver bandpass filter, the locally induced frequency modulation has insufficient effect on the output of the AM detector to activate the alarm indicator. The threshold detector may be adjusted to allow varying degrees of departure from the center frequency before the alarm indicator is activated. In effect, the present invention introduces a tracer signal into a conventional VOR receiver by means of which an output alarm or other annunciation may be generated if the receiver is tuned to an unused channel adjacent an active channel or if the receiver is sufficiently mistuned from the desired channel, which situations give rise to the generation of false VOR bearing indications.

Although the present invention has been described with respect to particular embodiments thereof, it is not to be so limited as changes might be made therein which fall within the scope of the invention as defined in the appended claims.

I claim:

1. In a variable omnirange receiver, said receiving comprising a local oscillator and frequency mixing means from which is developed an intermediate frequency signal, intermediate frequency bandpass filtering means receiving said intermediate frequency signal and supplying an input to amplitude modulation detection means, and direction determining circuitry receiving the output from said amplitude modulation detecting means and producing a signal proportional to the bearing between said receiving means and a tuned ground station source; means for monitoring the asymmetrical presence of signal components in the passband of said intermediate frequency bandpass filter the presence of which is indicative of said receiver being tuned to an inactive channel adjacent an active channel, said monitoring means comprising means for frequency modulating said receiver local oscillator at a predetermined low frequency deviation rate, signal presence detecting means connected to monitor the output of said receiver amplitude modulation detecting means and develop an output signal in response to the presence of signal components at said low frequency rate and in excess of a predetermined magnitude, an alarm indicating means, said signal presence detecting means being connected to and activating said alarm indicating means in response to said signal presence detecting means output signal.

2. A monitoring means as defined in claim 1 wherein said signal presence detecting means comprises synchronous signal amplitude detection means receiving the output from said receiver amplitude modulation detecting means as a first input thereto and a signal corresponding to said low frequency deviation rate as a reference signal input thereto, and signal threshold detecting means receiving the output from said synchronous signal amplitude detection means and supplying an activating output signal to said alarm indicating means in response to said synchronous detection means output signal exceeding a predetermined magnitude.

3. A monitoring means as defined in claim 2 wherein said means for frequency modulating comprises a low frequency oscillator generating said low frequency deviation rate signal, a frequency modulation means receiving the output of said low frequency oscillator and connected to said receiver local oscillator to frequency modulate the output frequency thereof at said low frequency oscillator rate, and the output of said low frequency oscillator comprising said reference signal input to said synchronous signal amplitude detection means.

4. A monitoring means as defined in claim 1 wherein said signal presence detecting means comprises a frequency selective device connected to the output of said receiver amplitude modulation detecting means and adapted to selectively pass signal frequency components at a rate defined by said means for frequency modulating, and signal threhold detecting means receiving the output from said frequency selective device and supplying an activating signal to said alarm indicating means in response to said frequency selective device output signal exceeding a predetermined magnitude.

5. A monitoring means as defined in claim 4 wherein said frequency selective device comprises a bandpass filter with passband centered at a frequency corresponding to said low frequency deviation rate.

6. A monitoring device as defined in claim 4 wherein said means for frequency modulating comprises a low frequency oscillator generating said low frequency deviation rate signal, a frequency modulation means receiving the output of said low frequency oscillator and connected to said receiver local oscillator to frequency modulate the output frequency thereof at said low frequency oscillator rate.

7. A monitoring means as defined in claim 4 wherein said signal threshold detecting means comprises an amplitude detector receiving the output of said frequency selective device and a signal threshold detector receiving the output of said amplitude detector, said signal threshold detector supplying an activating signal to said alarm indicating means in response to the output from said signal threshold detector exceeding a predetermined magnitude.

* * * * *